United States Patent [19]
Kanno

[11] Patent Number: 5,726,956
[45] Date of Patent: Mar. 10, 1998

[54] APPARATUS AND METHOD FOR CONTROLLING PLURAL DISC REPRODUCING APPARATUS FOR CONTINOUS REPRODUCTION

[75] Inventor: Hajime Kanno, Ibaraki, Japan

[73] Assignee: Sony Corporation, Tokyo, Japan

[21] Appl. No.: 614,400

[22] Filed: Mar. 12, 1996

[30] Foreign Application Priority Data

Mar. 15, 1995 [JP] Japan .................... 7-056112

[51] Int. Cl.$^6$ .................................... G11B 17/22
[52] U.S. Cl. .............................. 369/30; 369/36
[58] Field of Search ................... 369/30, 36, 34, 369/37, 38, 33; 395/375, 306

[56] References Cited

U.S. PATENT DOCUMENTS

| | | | |
|---|---|---|---|
| 5,375,113 | 12/1994 | Pollard et al. | 369/30 |
| 5,495,457 | 2/1996 | Takagi | 369/30 |
| 5,615,345 | 3/1997 | Wanger | 369/30 X |

*Primary Examiner*—Ali Neyzari
*Attorney, Agent, or Firm*—Limbach & Limbach L.L.P.; Seong-Kun Oh

[57] ABSTRACT

A system having a plurality of disc reproducing apparatus and a controller for controlling the apparatus. The controller manages control so that no silent time interval is produced during disc exchange or during switching between the plural disc reproducing apparatus.

23 Claims, 13 Drawing Sheets

PLAYER STATUS S

| 4 | 1 | 3 | 8 |
|---|---|---|---|
| CATEGORY | 1 | EQUIPMENT NUMBER | STATUS |

CD=1001

| | |
|---|---|
| 10a | 000 |
| 10b | 001 |
| 10c | 010 |

| | | | |
|---|---|---|---|
| PLAY | 00000000 | NO DISC MEMO | 00010000 |
| STOP | 00000001 | NO DELETION | 00010001 |
| PAUSE | 00000010 | NO GROUP MEMO | 00010010 |
| THERE IS NO DISC | 00000101 | NO GROUP REGISTRATION | 00010011 |
| THERE IS DISC | 00001000 | NO TOC INFORMATION | 00010100 |
| 30 SECOND LEFT | 00001100 | NO INTERPRETATION INFORMATION | 00010101 |

FIG.7A

PLAYER DATA DS

| 4 | 1 | 3 | 8 | 8 | 40~104 | BIT |
|---|---|---|---|---|---|---|
| CATEGORY | 1 | EQUIPMENT NUMBER | TYPE | DISC/GROUP NUMBER | DATA | (VARIABLE LENGTH) |

| | |
|---|---|
| DISC MEMO | 01000000 |
| DELETE | 01000001 |
| GROUP MEMO | 01000010 |
| GROUP REGISTRATION | 01000011 |
| TOC INFORMATION | 01100000 |

| | |
|---|---|
| DISC 1 | 00000001 |
| DISC 2 | 00000010 |
| ⋮ | ⋮ |
| DISC 100 | 00000000 |
| GROUP 1 | 00000001 |
| GROUP 2 | 00000010 |
| ⋮ | ⋮ |
| GROUP 10 | 00010000 |

CHARACTER INFORMATION IS ASCII DATA, NUMERICAL DATA IS BCD AND OTHERS ARE BIT DATA

APPARATUS AND METHOD FOR CONTROLLING PLURAL DISC REPRODUCING APPARATUS FOR CONTINOUS REPRODUCTION

BACKGROUND OF THE INVENTION

This invention relates to a system for controlling plural disc reproducing apparatus.

Nowadays, a disc reproducing apparatus, configured for selecting one of a plurality of enclosed disc-shaped recording media, such as play-only optical discs, and for reproducing the main information, such as audio signals, recorded on the selected optical disc, and the discrimination information, that is the table of contents (TOC) information functioning as the table of contents for the main data, such as the capacity or the recording position of each program for the main information, is in popular use.

Such disc reproducing apparatus includes an enclosing unit for enclosing each of the optical discs in a disc inserting groove having an address allocated thereto for the optical disc, and a selection unit for selecting the optical discs enclosed in the enclosure unit. The disc reproducing apparatus also includes a reproducing unit for reproducing the main information and the discrimination information of the optical disc selected by the selection unit, and an actuation unit for setting the operation of the apparatus or entering the custom information, such as the memo information displayed on a display unit, program-based deletion information for inhibiting the reproduction, sound level or sound volume information or the information specifying the disc genre or the name of the user of the optical disc. In addition, the disc reproducing apparatus includes an intrinsic information memory for storing the intrinsic information, that is the discrimination information reproduced by the reproducing means or the custom information entered by the actuating unit, in association with the addresses, and a display and editing memory for displaying the fixed information stored in the intrinsic information memory during reproduction and for storing the editing data.

The disc reproducing apparatus is responsive to actuation by the actuation unit to perform display and reproduction based upon the intrinsic information stored in the display and editing memory.

In the reproduction operation, the disc reproducing apparatus selects a desired one of plural discs enclosed in the enclosure unit, by the selection unit, and mechanically switches to the selected disc. The reproducing apparatus then first reproduces the TOC information of the selected disc by its reproducing unit, and access the program in the selected disc to be reproduced based upon the reproduced TOC information before proceeding to reproduction of the main information of the selected optical disc. Thus, the reproduction is interrupted during the time the disc reproducing apparatus transfers from the reproduction of a given disc to the reproduction of the next disc. This produces the silent time interval, thus possibly frustrating the listener.

SUMMARY OF THE INVENTION

It is therefore an object of the present invention to provide a disc reproducing apparatus which enables continuous reproduction for assuring high operability.

In one aspect, the present invention provides a disc system having a plurality of disc reproducing apparatus each configured to housing at least one disc and to reproduce the discs. The disc system controls the playback sequence of the disc reproducing apparatus. The disc system includes time detection means for detecting the residual play time of a disc currently reproduced by one of the plural disc reproducing apparatus, comparator means for comparing the residual play time detected by the time detection means to a pre-set time, and control means for controlling an optional optical disc of another of the plural disc reproducing apparatus to a stand-by state for reproduction based upon the result of a comparison by the comparator means. The control means cancels the stand-by state of the optional disc of the second disc reproducing apparatus upon detection of the termination of the reproduction of the disc by the first disc reproducing apparatus.

In another aspect, the present invention provides a controller for use with plural interchange type disc reproducing apparatus each housing a plurality of discs and each configured to select and reproducing an optional one of the discs. The controller controls the playback sequence of the plural interchange type disc reproducing apparatus. The controller includes reception means for receiving the playback state of the disc being reproduced by one of the plural interchange type disc reproducing apparatus, and transfer means for transferring a command for controlling an optional disc of a second interchange type disc reproducing apparatus to a playback stand-by state if the residual play time information as judged based upon the play state received by the reception means is less than a pre-set value. The transfer means also transfers a command for canceling the playback stand-by state of the optional disc of the other disc reproducing apparatus if, based upon the play state received by the reception means, the reproduction of the disc by the first interchange type disc reproducing apparatus is judged to have come to a close.

With the disc reproducing apparatus according to the present invention, if time detection means detects that the residual play time of reproduction by the reproducing means currently in operation is less than a pre-set time, the control means starts the preparation for reproduction by the reproducing means to be in the subsequent operation. The playback operation by the reproducing means to be in operation next is started the instant the reproduction by the reproducing means currently in operation comes to a close. Thus, with the disc reproducing apparatus of the present invention, the discs housed within the housing means may be continuously reproduced by the plural reproducing means with high operability without waste time.

In addition, a plurality of dscs may be housed within the housing means and one of the discs housed within the housing means may be selected and reproduced by the reproducing means. Thus there is provided a disc reproducing system in which plural discs housed within the housing means may be continuously reproduced by plural reproducing means with high operability without waste time.

BRIEF DESCRIPTION OF THE DRAWINGS

FIG. 7A shows the data structure of the status information transferred from the interchange type disc reproducing apparatus to the controller.

FIG. 7B shows the data structure of data transferred from the interchange type disc reproducing apparatus to the controller.

DESCRIPTION OF THE PREFERRED EMBODIMENTS

Figure 1:
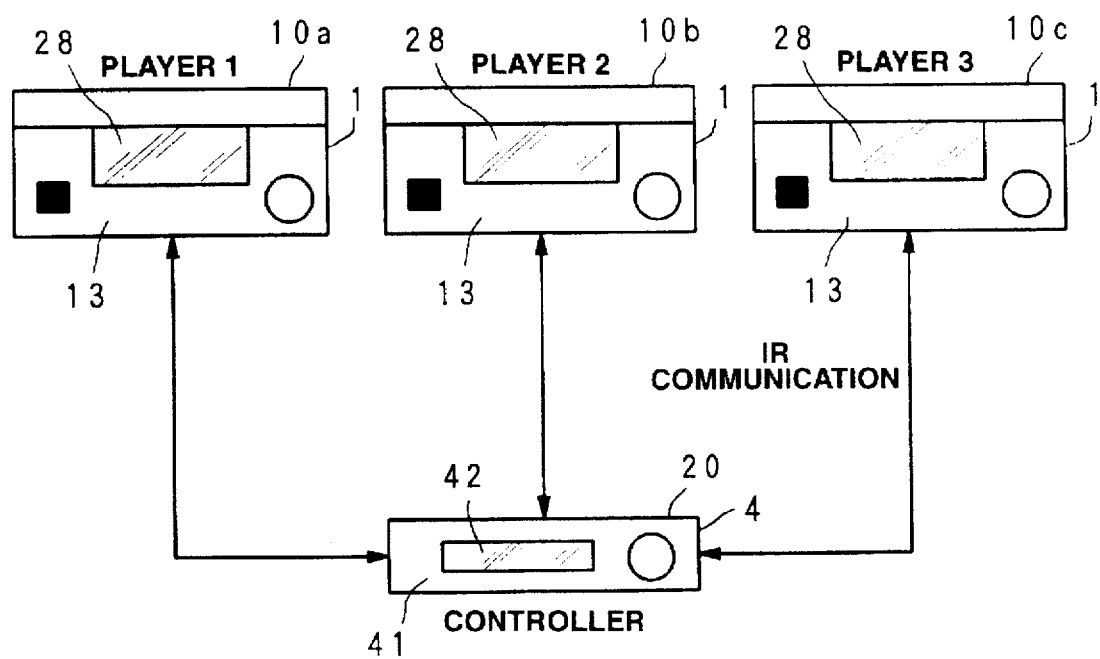
FIG. 1 illustrates the interconnection between a controller according to the present invention and a plurality of interchange type disc reproducing apparatus.

Referring to FIG. 1, a disc reproducing apparatus of the present invention includes three interchange type disc reproducing apparatus 10a, 10b and 10c each housing plural optical discs and configured to select and reproduce an optional one of the optical discs, and a disc controller 20 for setting the play sequence of the three interchange type disc reproducing apparatus 10a, 10b and 10c, selecting one of the plural optical discs housed within the three interchange type disc reproducing apparatus 10a, 10b and 10c and reproducing the information signals recorded on the selected optical disc.

Figure 2:
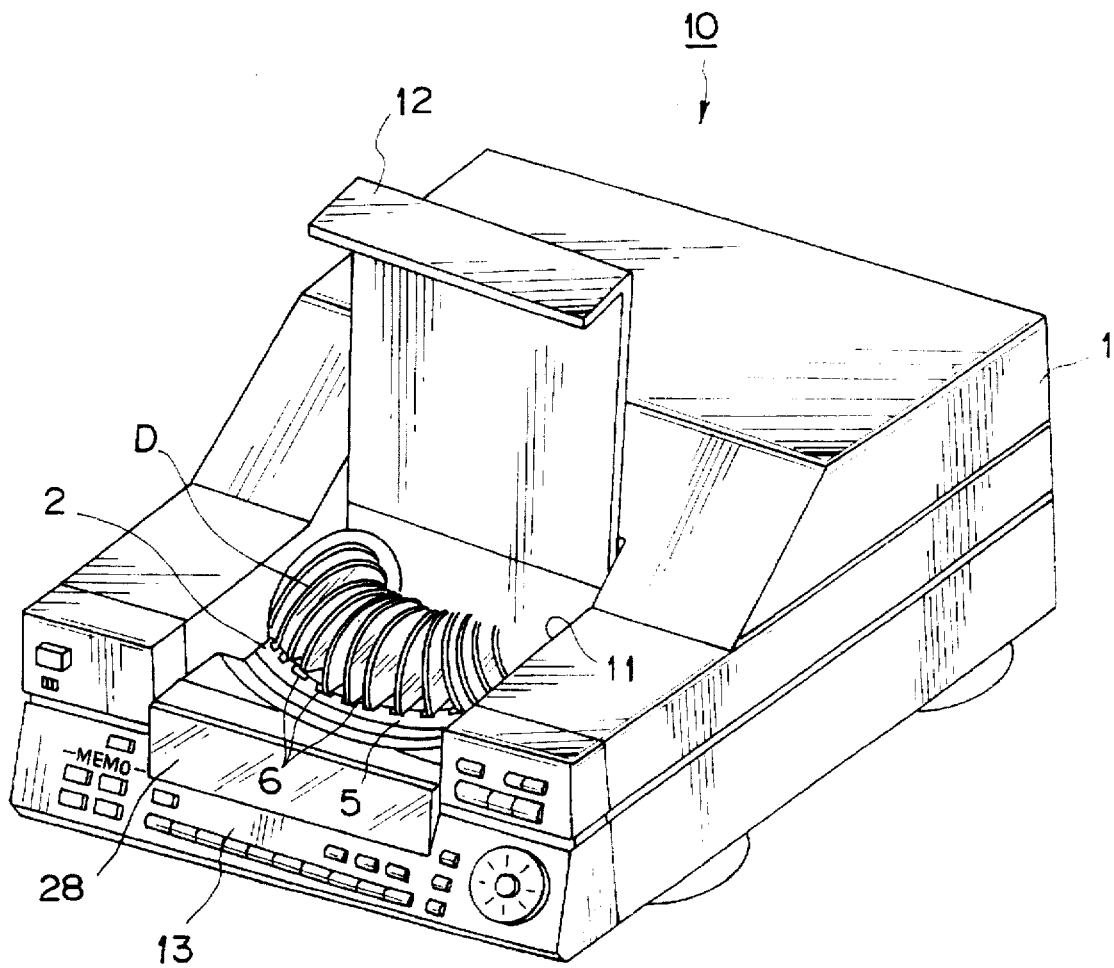
FIG. 2 is a perspective view showing an interchange type disc reproducing apparatus according to the present invention.

Assuming that the three interchange type disc reproducing apparatus 10a, 10b and 10c are of the same configuration, and an optional one of the interchange type disc reproducing apparatus 10a, 10b and 10c is an interchange type disc reproducing apparatus 10, as shown in FIG. 2, this interchange type disc reproducing apparatus 10 has a substantially parallelepipedic-shaped outer casing 1 constituting the main portion of the apparatus, within which is housed a disc housing unit 2 capable of housing 100 optical discs D. A disc reproducing unit, not shown, is housed within the main portion of the apparatus for reproducing the sole optical disc D selected from within the disc housing unit 2.

On the front side of the outer casing 1 are mounted an operating panel 13 having an operating switch or an operating button for actuating the disc reproducing apparatus and a display unit 28 for displaying the playback state of the interchange type disc reproducing apparatus 10.

The disc housing unit 2 has a circular rotary table 5 rotatably supported by a supporting shaft set upright on the bottom surface of the outer casing 1. Since a rotary table 5 constituting the main portion of the disc housing unit 2 is supported by the supporting shaft set upright on the bottom surface of the outer casing 1, the rotary table 5 is rotated in a plane parallel to the bottom surface of the outer casing 1, that is, parallel to the mounting surface of the disc housing unit 2.

The disc housing unit 2 has a disc insertion/discharge opening 11 for inserting/discharging optical discs D. This disc inserting/discharge opening 11 is formed for extending from the front side towards the back side of the outer casing 1. The disc insertion/discharge opening 11 is dimensioned to permit some of a large number of disc-insertion grooves 6 provided on the rotary table 5 to be exposed to the outside. Specifically, the disc insertion/discharge opening 11 is dimensioned to permit about one-quarter of the one-hundred disc insertion groves 6 to be exposed to the outside. To each of the disc insertion grooves 6 is allocated an address. The optical discs D may be introduced into and discharged out of the disc insertion grooves 6 opened to the outside via the disc insertion/discharge opening 11 for interchanging the optical discs D held in the disc insertion grooves 6. The disc insertion/discharge opening 11 is covered by an openable lid 12 formed of a transparent synthetic resin. The lid 12 may be kept closed during reproduction of the optical disc D, or, when the interchange type disc reproducing apparatus 10 is not in use for prohibiting the optical disc housed within the disc housing unit 2, from inadvertently contacted the outside via the disc insertion/discharge opening 11 and for prohibiting dust and dirt from being introduced into the outer casing 1 for protecting the optical discs D. The disc housing unit 2 operates as the housing unit.

A disc reproducing unit 3 is mounted via a disc reproducing unit mounting substrate arranged within the outer casing 1, and includes a disc transporting mechanism for transporting the selected one of the plural optical discs D housed within the disc insertion grooves 6 of the rotary table 5 if the disc housing unit 2, and a disc rotation and driving mechanism having a disc table on which may be loaded the optical disc D transported by the disc transporting mechanism. In addition, the disc reproducing unit includes an optical pickup unit operating as reproducing means for radiating a light beam to the signal recording surface of the optical disc D loaded on and rotationally driven by the disc rotation and driving mechanism for reproducing the main information recorded on the optical disc D, such as audio signals and the discrimination information. The optical pickup unit includes an optical pickup having an objective lens for condensing a light beam outgoing from a light source such as a semiconductor laser to the signal recording surface of the optical disc D. This optical pickup is supported by a slide guide shaft, not shown, for radially scanning the signal recording surface of the optical disc D loaded on the disc rotation and driving mechanism across the inner and outer peripheries of the optical disc D. Thus the disc reproducing unit 3 functions as a reproducing unit.

Meanwhile, the disc reproducing unit 3 is arrayed so that the rotary shaft of the disc rotation and driving mechanism is perpendicular to the supporting shaft disposed at the center of rotation of the disc table 5 of the disc housing unit 2. Thus, the optical disc D loaded on the disc rotation and driving mechanism for being run in rotation has its rotational surface parallel to the axial direction of the supporting shaft of the disc housing unit 2. By arranging the disc housing unit 2 in this manner, the optical disc D, housed and held within the disc housing unit 2 with its major surface substantially parallel to the supporting shaft, is transported by a disc transporting mechanism so as to be loaded on the disc reproducing unit 3 without changing the above-mentioned orientation of the major surface. Thus the disc reproducing unit 3 functions as reproducing means provided with the selection unit.

Figure 3:
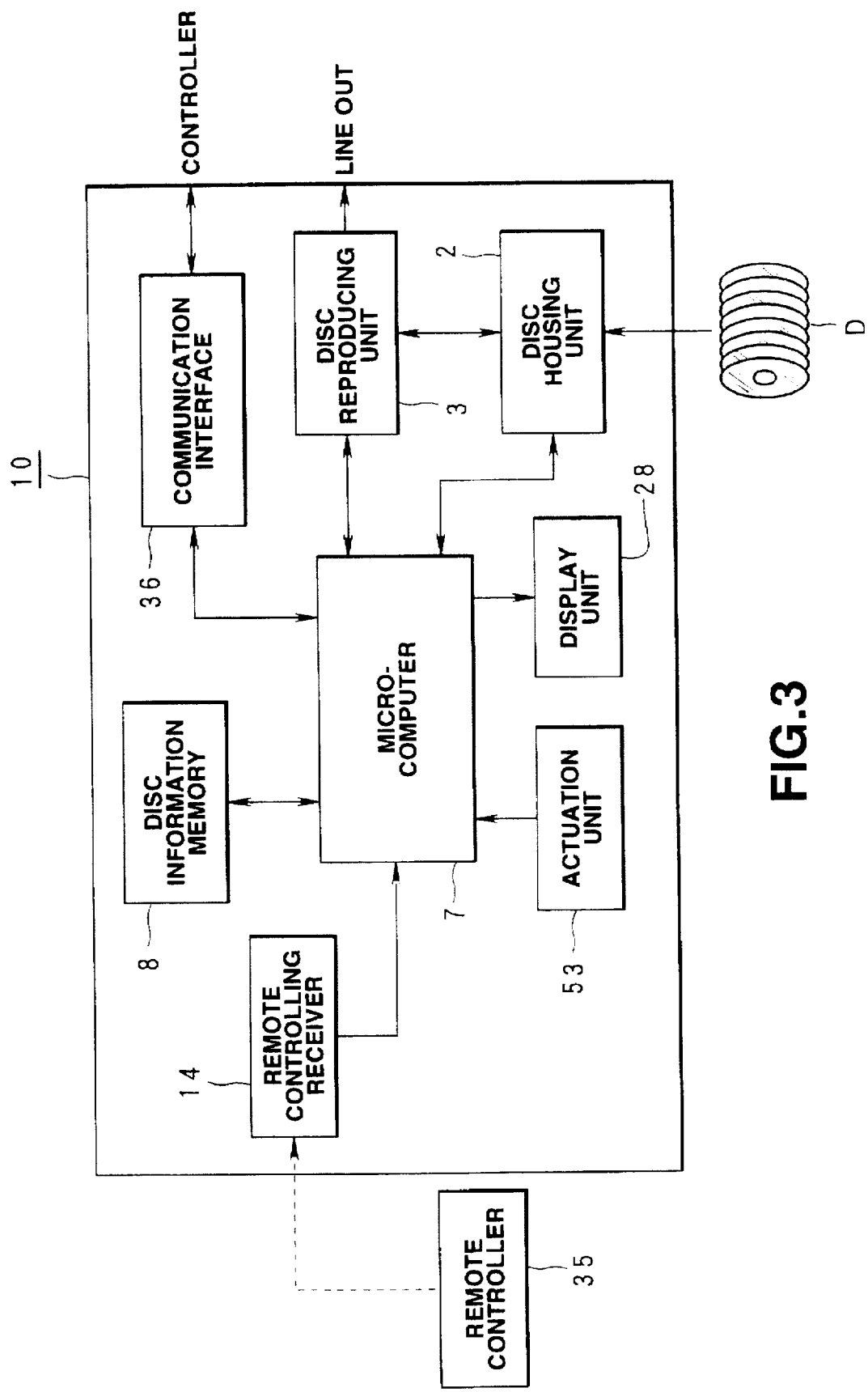
FIG. 3 is a block diagram showing the inside structure of the interchange type disc reproducing apparatus of FIG. 2.

Referring to FIG. 3, an electrical system of the interchange type disc reproducing apparatus 10 has an actuation unit 53 having the actuating panel 13 of FIG. 2, and a remote-controlling receiving unit 14 for receiving operating signals from a remote controller 35. The operating panel 13 has actuation switches or actuation buttons which, when on actuation, generates actuating signals. The electrical system of the interchange type disc reproducing apparatus 10 also includes a micro-computer 7 for processing the character information responsive to the actuation signals or controlling various portions and a disc information memory 8 for storing the intrinsic information, the display information or the editing information processed by the micro-computer 7. The electrical system also includes a display unit 28 for displaying the character information supplied from the disc information memory 8, the disc housing unit 2, and the disc reproducing unit 3 controlled by the micro-computer 7. In addition, the electrical system of the interchange type disc reproducing apparatus 10 includes a communication interface 36 for communicating with the disc controller 20.

Referring to FIG. 3, the disc controller 20 has, on the front side of the outer casing 4 constituting a substantially parallelepipedic main portion of the apparatus, an actuation panel 41 and a display unit 42 for displaying the playback state of the interchange type disc reproducing apparatus 10a, 10b and 10c. The actuation panel 41 has mounted thereon actuation switches or buttons for actuating the disc controller 20. The major actuation switches and buttons, mounted on the actuation panel 41, are shown in the enlarged side elevational view of FIG. 4. These actuation switches and buttons include, on the upper left side of the actuation panel 41, a power source switch 15, and, on the upper right side thereof, a series of mode setting keys 16. These mode setting keys 16 include a key 16a for commanding reproduction from the optical disc D, a pause key 16b, a stop key 16c, a manual selection key 16d for manually setting the interchange type disc reproducing apparatus among the interchange type disc reproducing apparatus 10a, 10b and 10c which is to reproduce an optical disc, a backward key 16e for commanding program accessing in the backward direction and a forward key 16f for commanding program accessing in the forward direction. On the lower center position of the actuation panel 41, disc group designating keys 17a to 17j for grouping 100 optical discs D into units each made up of a pre-set number of discs depending upon the contents of the recorded information or the frequency of disc reproduction by the user. In the instant embodiment, the disc group designating keys are comprised of ten keys including the first the group designating key 17a and the tenth disc group designating key 17j. A disc group entry key 18 is mounted above the first disc group designating key 17a. On the left side of the disc group entry key 19 is arrayed a switching designating key 19 for registering the character information on the disc title, group name or the program name. On the left side of the switching designating key 19 is arrayed a memo scan key 21 for sequentially displaying the input memo information on a memo display unit 30 as explained subsequently.

Figure 4:
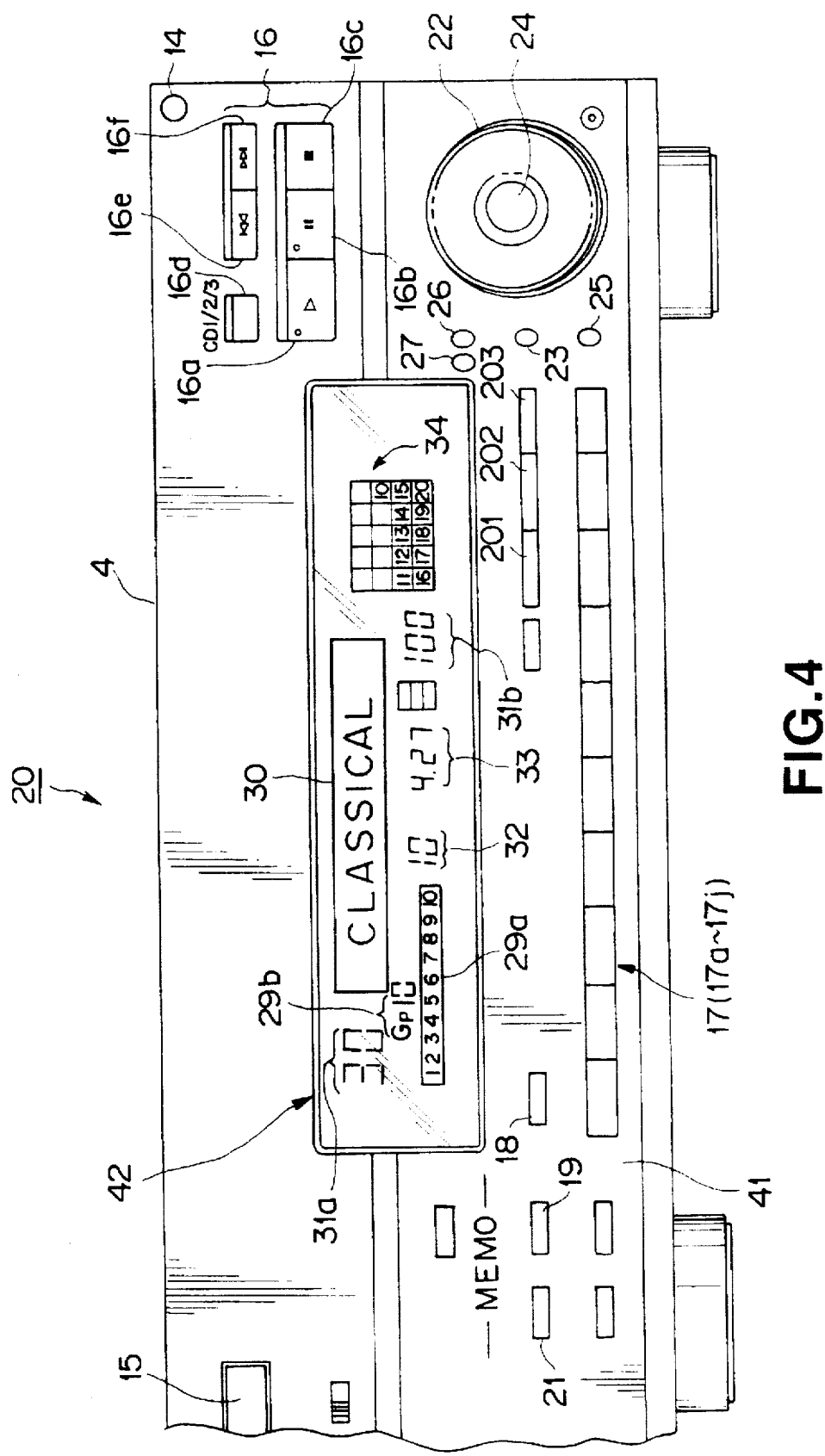
FIG. 4 is a front view showing a front panel of the controller of FIG. 1.

In the disc controller 20 of the instant embodiment, a rotary jog 22 is mounted on the right lower side of the actuation panel 41 in FIG. 4. On the left side of the rotary jog 22 are arrayed a memo input key 26, a search button 27, a file key 23 and an erasure key 25. The rotary jog 22 has a pushbutton switch 24 for setting intrinsic data for the actuation panel 41. The rotary jog 22 has for example ten intermittent stop positions per full rotation, at an interval of 36 degrees, so that data may be updated at each stop position. If the rotary jog 22 is rotated towards the right or the left, data is updated in the positive (+) direction or in the negative (−) direction, respectively.

At a mid position of the actuation panel 41 is arrayed the display unit 42 constituted of, for example, a liquid crystal display or a FL tube. The display unit 42 has a registration group display unit 29a for displaying the figure of the registered group number by lighting the figure, a disc group number display unit 29b for displaying the selected disc group number or the current disc group number, and a memo display unit 29c for displaying the memo such as the title concerning the selected address or the current address. The display unit 42 has a first and second address portions 31a, 31b, respectively for displaying the address allocated to the selected disc or the disc being reproduced, and a track number display unit 32 for displaying the track number of the disc being played. In addition, the display unit 42 has a time display unit 33 and a program number display unit 34 for displaying the program number of the disc being played or the number of residual programs (programs yet to be played) of the disc.

The playback modes may be enumerated by a continuous playback mode, generally termed the CONTINUE mode, a random playback mode, generally termed the SHUFFLE mode and the program mode, generally termed the PROGRAM mode. The playback modes may be selectively set by actuation of three mode setting keys 201, 202 and 203 arrayed on the right side of the actuation panel 41. If the CONTINUE mode is desired, the leftmost mode setting CONTINUE key 201 is set. At this time, an LED disposed above the key 201 is lit.

The remaining two modes, that is the SHUFFLE mode and the PROGRAM mode, can be set by actuating the central SHUFFLE key 202 and the rightmost PROGRAM key 203, respectively. At this time, LEDs disposed above the keys 202 and 203, respectively are lit.

Figure 5:
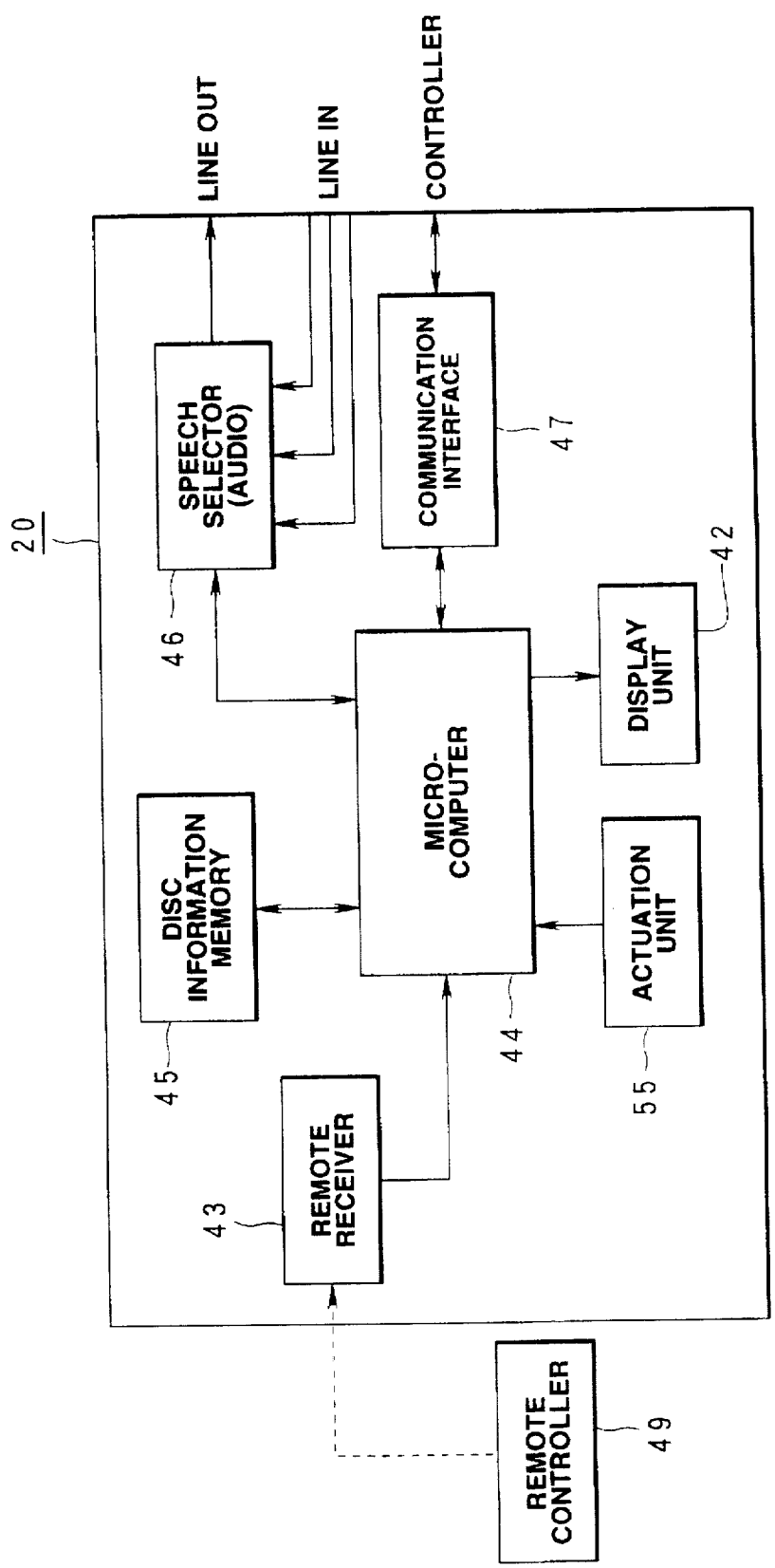
FIG. 5 is a block diagram showing the inside structure of the controller of FIG. 1.

Referring to FIG. 5, the electrical system of the disc controller 20 includes an actuation unit 55, provided with the actuation panel 41, and a remote-controlling receiving unit 43 for receiving a command signal from a remote controller 49. The actuation panel 41 has actuation switches or buttons arrayed thereon for generating actuating signals. The electrical system also includes a micro-computer 44 for processing the character information for controlling various parts by an associated actuation signal, and a disc information memory 45 for storing the intrinsic information, the display information or the editing information processed by the micro-computer 44. In addition, the electrical system includes the display unit 42 for displaying the character information supplied from the disc information memory 45, an audio selector 46 for selecting an audio input from the three interchange type disc reproducing apparatus 10a, 10b and 10c, and a communication interface 47 for communication of control signals between the interchange type disc reproducing apparatus 10 and the disc controller 2.

Figure 6:
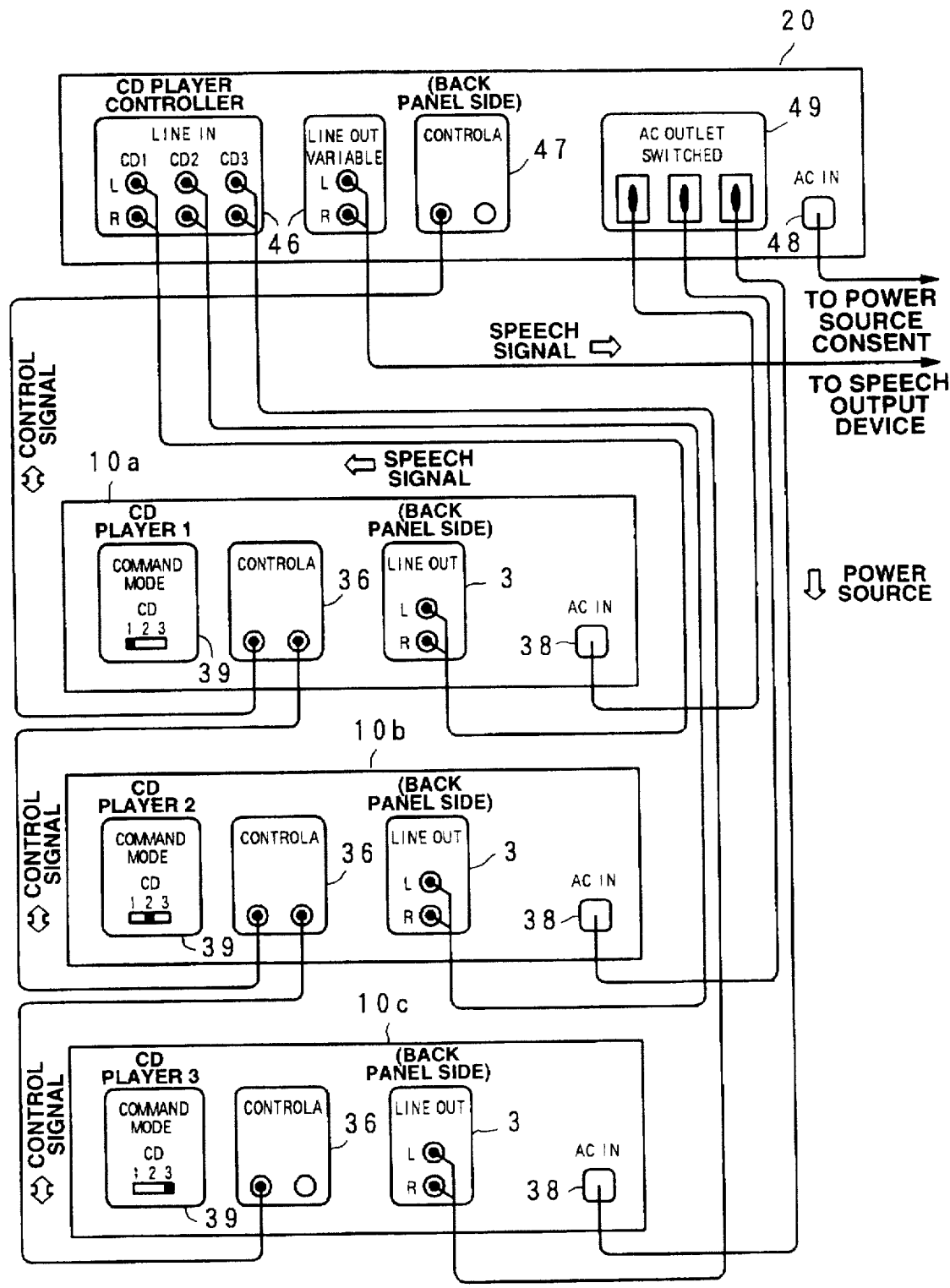
FIG. 6 is a detailed interconnection diagram for illustrating the interconnection between the controller and the interchange type disc reproducing apparatus.

As shown in FIG. 6, the interchange type disc reproducing apparatus 10a, 10b and 10c and the disc controller 20 are interconnected in such a manner that a control signal is supplied from a communication interface 47 of the disc controller 20 to the communication interface 36 of the interchange type disc reproducing apparatus 10a, thence to the communication interface 36 of the interchange type disc reproducing apparatus 10b and thence to the communication interface 36 of the interchange type disc reproducing apparatus 10c. On the other hand, playback signals of the disc reproducing units 3 of the interchange type disc reproducing apparatus 10a, 10b and 10c are supplied to the audio selector 46 of the disc controller 20 and audio signals of the interchange type disc reproducing apparatus selected by the selector 46 are provided to an audio output unit. The interchange type disc reproducing apparatus 10a, 10b and 10c are provided with power input terminals 38, 38, 38 fed with the power and command mode setting switches 39, 39, 39 for setting the equipment numbers. The disc controller 20 has a power source input terminal 48 fed with the electric power and a power source selector 49 for selectively supplying the power from a power source to the power source input terminals 38, 38, 38 of the three interchange type disc reproducing apparatus 10a, 10b and 10c.

The above control signals include a data signal DS, a model data signal MD, a command signal and a status signal S of the interchange type disc reproducing apparatus 10a, 10b and 10c currently in operation.

As shown in FIG. 7A, the status signal S is made up of the category information, specifying the type of the equipment, and the command flag information, which becomes "0" and "1" in case of a command signal and otherwise, respectively, as well as the equipment number information and the status information set by the command mode setting switches 39. The status information specifies the operating state information, such as PLAY, STOP, PAUSE or the residual play time, such as 30 seconds.

As shown in FIG. 7B, the data signal DS is made up of the category information specifying the type of the equipment, the command flag information which becomes "0" and "1" in case of a command signal and otherwise, respectively, the equipment number information, data type information, disc/group number information and the display information, as set by the command mode setting switches 39.

Figure 7C:
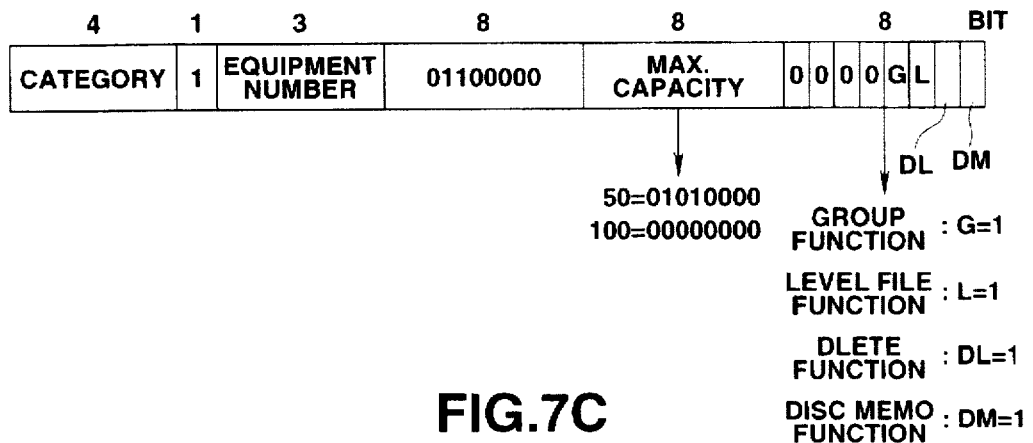
FIG. 7C shows the data structure of model data transferred from the interchange type disc reproducing apparatus to the controller.

As shown in FIG. 7C, the model data signal MD is made up of the category information specifying the type of the equipment, the command flag information which becomes "0" and "1" in case of a command signal and otherwise, respectively, as well as the equipment number information, data type information (=TOC information), the stored volume information and the functional information on the functions of the reproducing apparatus, as set by the command mode setting switches 39. The function information is the flag information specifying the presence or absence of the group function, level file function, delete function and disc memo function.

Figure 7D:
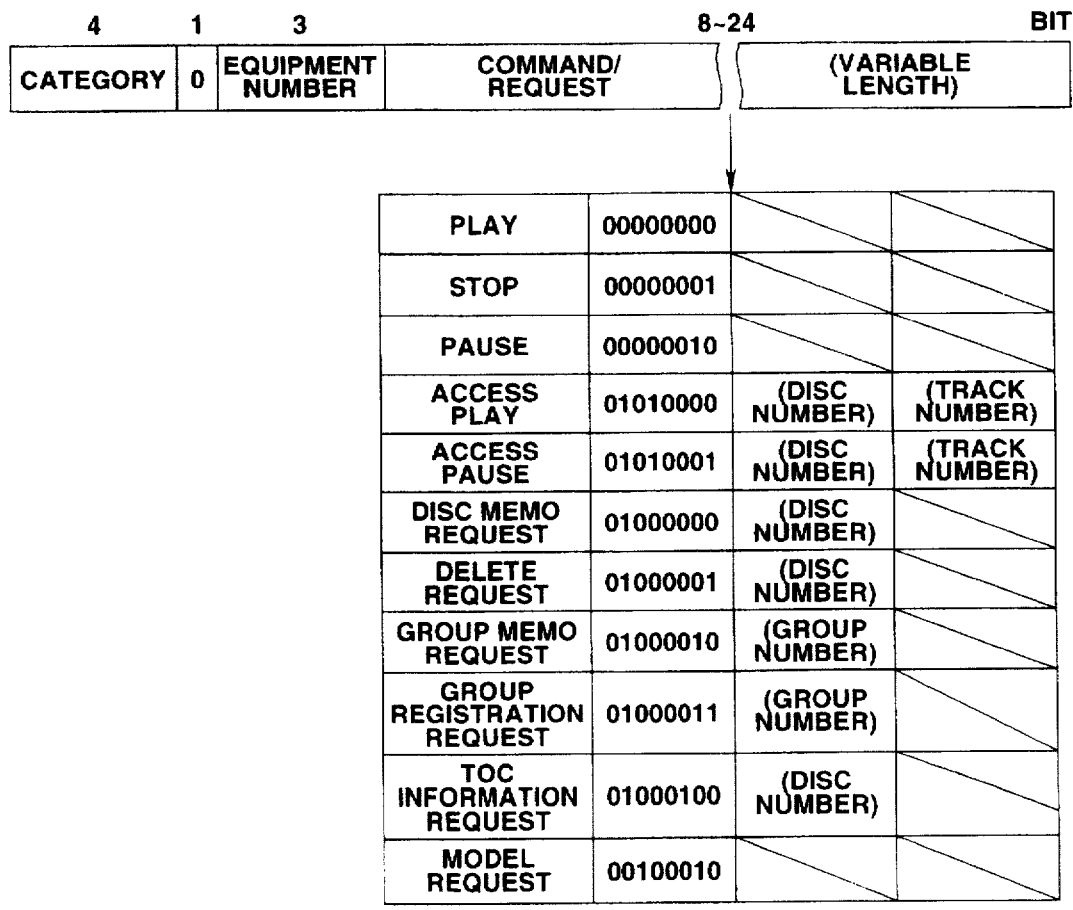
FIG. 7D shows the data structure of instructions transferred from the controller to the interchange type disc reproducing apparatus.

As shown in FIG. 7D, the command signal C is made up of the category information specifying the type of the equipment and the command flag information which becomes "0" and "1" in case of a command signal and otherwise, respectively, as well as the equipment number information and the command or request information as set by the command mode setting switches 39. The command or request information represents the command information such as PLAY, STOP or PAUSE, information for preparation for command such as ACCESS PLAY OR ACCESS PAUSE, or the request information such as the information on the disc memory request, delete request, group memory request, group registration request, TOC information request or the model request.

Figure 8:
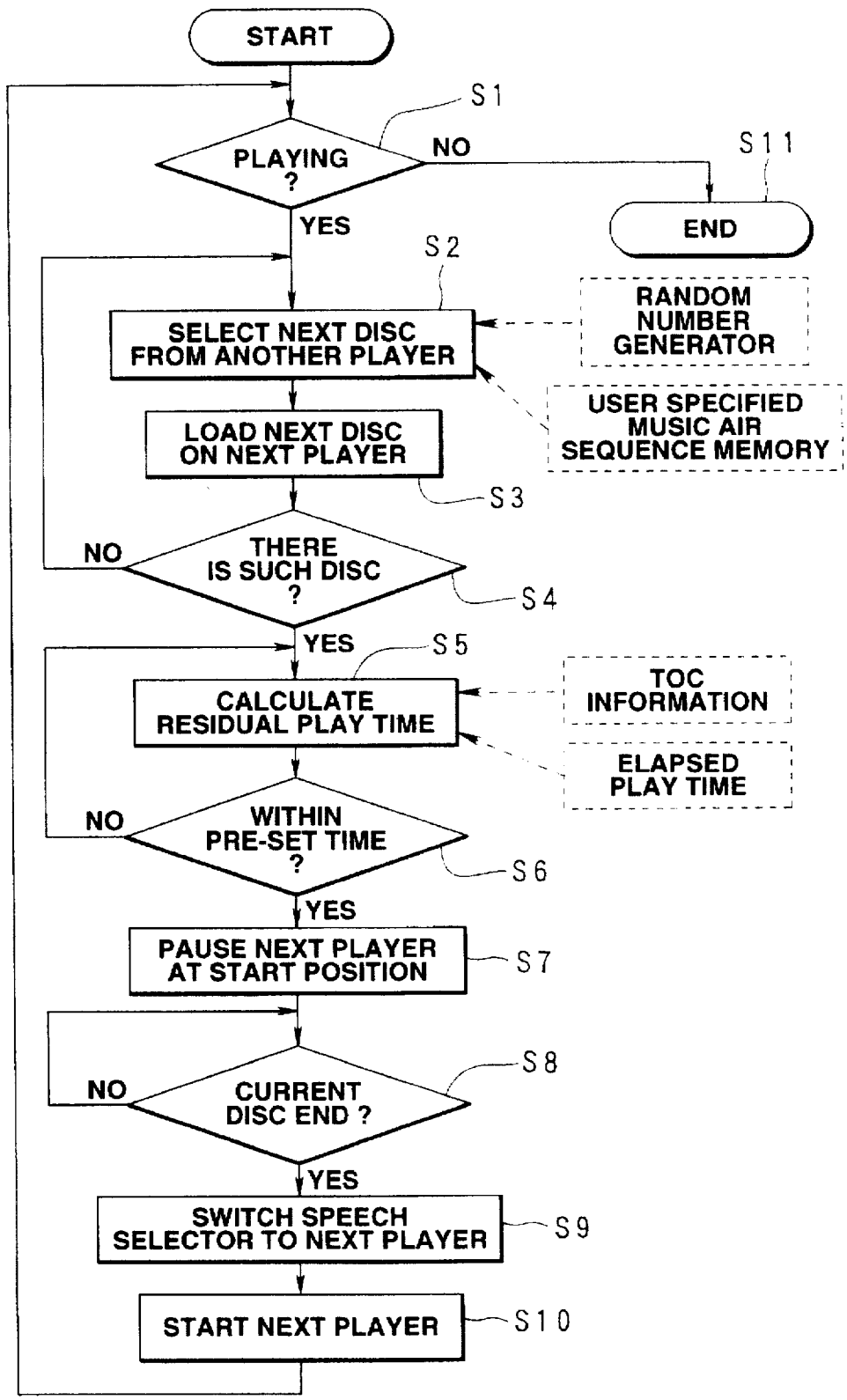
FIG. 8 is a flowchart illustrating a series of operations.

Referring to FIG. 8, the operation of the disc reproducing apparatus is explained.

If the interchange type disc reproducing apparatus 10a is reproducing an optical disc, the command signal C including category "1001", a command flag "0", equipment number "000" and the command/request "TOC information request: designated disc number" is first supplied from the communication interface 47 of the disc controller 20 to the interchange type disc reproducing apparatus 10a, while the data signal DS including category "1001", command flag "1", equipment number "000", type "TOC information", disc/groove number and display information, model data signal MD including category "1001", command flag 2", equipment number "000", type "TOC number", stored volume and various functional information, are supplied from the interchange type disc reproducing apparatus 10a to the interface 47.

At step S1, the play mode state is checked. If the play mode state is reproduction, processing transfers to step S2 and, if otherwise, to step S11. For such processing, the disc controller 20 receives the status signal S including category "1001", command flag "1", equipment number "000" and the status number from the interchange type disc reproducing apparatus 10a via communication interface 47 for judging whether or not the status information specifies "PLAY". Simultaneously, the disc controller 20 updates the play time display.

At step S2, the address of the disc insertion groove 6 of the rotary table 5 in the disc housing unit 2 of the interchange type disc reproducing apparatus 10 which is to start reproduction next is designated in accordance with the random number generated by a random number generator, not shown, provided in the disc controller 20, or the program number previously stored in a memory by user setting. The processing then transfers to step S3 for designating the interchange type disc reproducing apparatus 10b which is to start the subsequent reproduction, disc number and the track number.

At step S3, the optical disc D housed at the designated address of the interchange type disc reproducing apparatus 10b which is to start reproduction next is loaded on the disc rotation and driving mechanism of the disc reproducing unit 3. The processing then transfers to step S4. If the interchange type disc reproducing apparatus 10b is to start reproduction next, the command signal C including category "1001", command flag "0", equipment number "001" and the command/request "ACCESS PLAY: designated disc number and track number" is supplied from the communication interface 47 of the disc controller 20.

At step S4, it is judged whether or not the optical disc D is housed at the designated address. If the disc is stored at the designated address, the processing reverts to step S2 and, if otherwise, the processing transfers to step S5. The status signal S including category "1001", command flag "1", equipment number "001" and the status number is supplied from the interchange type disc reproducing apparatus 10b via the communication interface 47. Based upon the status information thus supplied, it is judged whether or not there is any disc.

At step S5, the disc controller 20 calculates the total play time based upon the TOC information previously reproduced by the interchange type disc reproducing apparatus 10a reproducing the disc under control by the disc controller 20 and detects the residual play time (=total play time less elapsed play time). The processing then transfers to step S6. Thus, the disc controller 20 functions as time detection means. Alternatively, the residual play time may also be calculated within the interchange type disc reproducing apparatus 10 and thence supplied to the disc controller 20. In this case, the interchange type disc reproducing apparatus 10 functions as the time detection means.

At step S6, it is judged whether or not the residual time is within a pre-set time, such as 30 seconds. If the result is YES, processing reverts to step S5 and, if otherwise, to step S7. For example, the disc controller 20 detects the residual time based upon the elapsed play time and the TOC information previously reproduced by the interchange type disc reproducing apparatus 10a. Alternatively, when the residual play time for the interchange type disc reproducing apparatus 10a currently reproducing the disc is less than 30 seconds, the status signal S including category "1001", command flag "1", equipment number "00" and the status information (="30 seconds left") are supplied from the interchange type disc reproducing apparatus 10a to the communication interface 47 of the disc controller 20 for detecting the residual play time by the disc controller 20.

At step S7, the interchange type disc reproducing apparatus 10b which is to reproduce the disc next is started and prepared for reproduction. The processing then transfers to step S8. If, for example, the interchange type disc reproducing apparatus to reproduce a disc is the apparatus 10b, the command flag C including category "1001", command flag "0", equipment number "001" and command/request "ACCESS PAUSE" is supplied from the communication interface 47 of the disc controller 20.

At step S8, it is judged whether or not the disc currently reproduced has come to an end. The processing is kept at a stand-by state before reproduction comes to a close. If the reproduction comes to a close, the processing transfers to step S9.

At step S9, the audio selector 46 is switched for supplying playback signals of the disc reproducing unit 3 of the interchange type disc reproducing apparatus 10 to reproduce the next disc to an audio outputting apparatus. The processing then transfers to step S10.

At step S10, reproduction of the interchange type disc reproducing apparatus 10 to reproduced the next disc is started. The processing then reverts to step S1. The command signal C including category "1001", command flag "0", equipment number "000" and command/request "STOP" is supplied from the communication interface 47 of the disc controller 20 to the interchange type disc reproducing apparatus 10a currently reproducing the disc. The command signal C including category "1001", command flag "0", equipment number "001" and command/request "PLAY" is supplied from the communication interface 47 to the interchange type disc reproducing apparatus 10b which is to reproduce the next disc. Thus, the disc controller 20 functions as the control means for controlling the interchange type disc reproducing apparatus 10a, 10b and 10c.

At step S11, the play mode is terminated based upon the reproduction coming to a close or upon a play stop command by the user.

Figure 9:
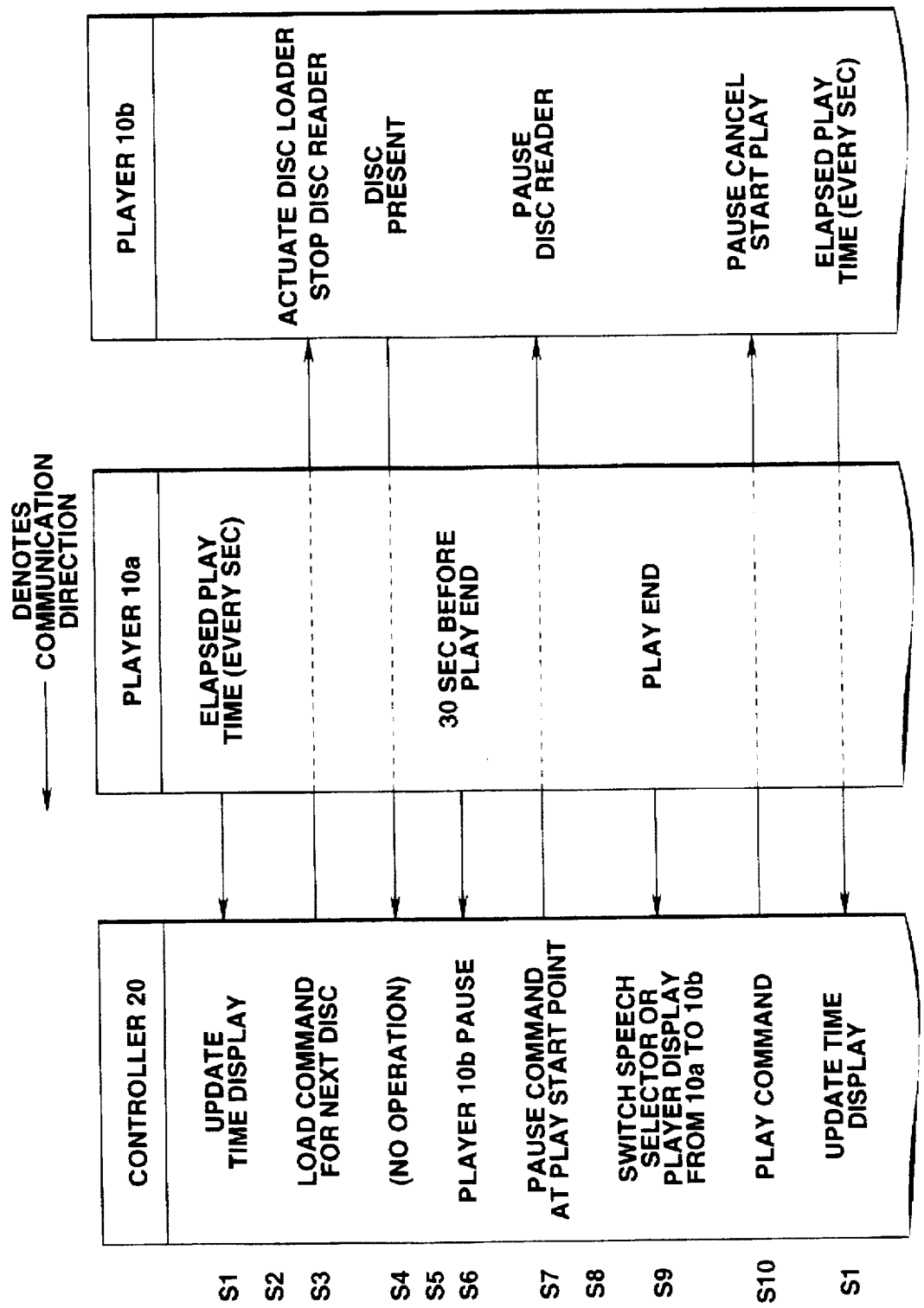
FIG. 9 is a transition diagram illustrating a command signal transferred between an interchange type disc reproducing apparatus and the controller.

FIG. 9 shows the transitional diagram of the flowchart of FIG. 8 showing the contents of the communication between the controller 20 and the plural interchange type disc reproducing apparatus 10a and 10b.

The steps S1 to S10 of FIG. 9 are equivalent to the steps of the flowchart of FIG. 8.

The interchange type disc reproducing apparatus 10a transmits the time of termination of reproduction to the controller 20, based upon the elapsed play time of the current disc and the TOC information which is the control information pre-recorded on the disc.

The controller 20 updates the time display based upon the residual play time information transferred thereto and transmits a load command for loading a disc on the interchange type disc reproducing apparatus which is to reproduce a next disc.

In FIG. 9, the interchange type disc reproducing apparatus. 10b is the apparatus to reproduce a next disc.

The interchange type disc reproducing apparatus 10b is responsive to the load command transferred from the controller 20 to load the disc to be reproduced on the reproducing unit for reading out the disc control information.

On detection of loading of the desired disc, the contents of the disc are transmitted to the controller 20.

The interchange type disc reproducing apparatus 10a then detects that the residual play time of the disc currently reproduced is less than 30 seconds, and advises the controller 20 of that effect.

Based upon the signal from the interchange type disc reproducing apparatus 10a to the effect that the residual play time of the disc currently reproduced is less than 30 seconds, the controller 20 transmits a command to the interchange type disc reproducing apparatus 10b for controlling its playback stand-by state.

Based upon the command transmitted from the controller 20, the interchange type disc reproducing apparatus 10b starts disc rotation while accessing the program desired to be reproduced for controlling it to the paused state.

On detection of the end of reproduction of the currently loaded disc, the interchange type disc reproducing apparatus 10a advises the controller 20 of that effect.

When the reproduction of the disc currently loaded comes to a close, the controller 20 controls the audio selector 46 for switching from the interchange type disc reproducing apparatus 10a to the interchange type disc reproducing apparatus 10b, while controlling the display unit 42 to switch to the corresponding display.

The controller 20 also transfers a play command to reproduce the interchange type disc reproducing apparatus 10b, which then cancels its paused state to start reproducing the disc.

The elapsed play time is continuously transmitted to the controller 20.

It is possible with the above-described interchange type disc reproducing apparatus to variably set the CONTINUE mode/ SHUFFLE mode/PROGRAM mode by the operation of the mode keys 201, 202 and 203 for performing the reproduction corresponding to the respective modes.

Figure 10A:
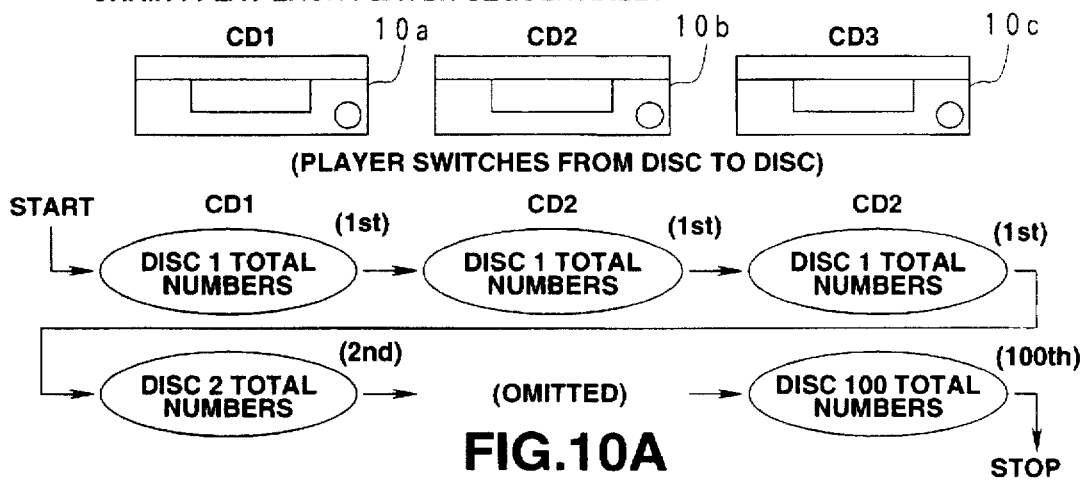
FIG. 10A illustrates an embodiment of a continuous reproduction of plural interchange type disc reproducing apparatus.
Figure 10B:
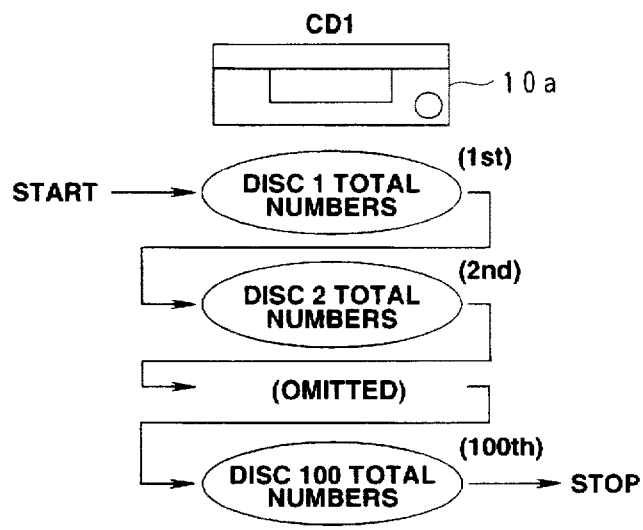
FIG. 10B illustrates an embodiment of a continuous reproduction of an optional interchange type disc reproducing apparatus.
Figure 10C:
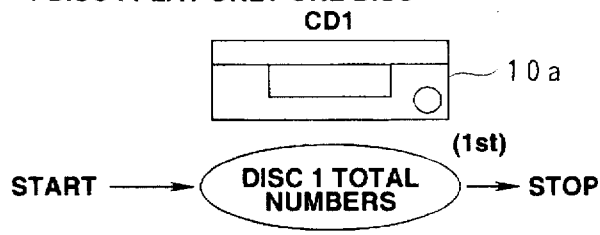
FIG. 10C illustrates an embodiment of a continuous reproduction of an optional disc of an optional interchange type disc reproducing apparatus.

The CONTINUE mode is made up of three play modes as shown in FIGS. 10A to 10C. The first play mode, shown in FIG. 10A, is a mode in which each first optical disc D of the interchange type disc reproducing apparatus 10a, 10b and 10c is reproduced in the sequence of 10a, 10b and 10c, each second optical disc D of the interchange type disc reproducing apparatus 10a, 10b and 10c is reproduced in the sequence of 10a, 10b and 10c, after the end of reproduction of the respective first discs, and each third optical disc D of the interchange type disc reproducing apparatus 10a, 10b and 10c is reproduced in the sequence of 10a, 10b and 10c, after the end of reproduction of the respective second discs, and so forth. In a similar manner, the third, fourth and the fifth discs etc. of the interchange type disc reproducing apparatus 10a, 10b and 10c etc. are reproduced in the sequence of 10a, 10b, 10c and so forth. The second play mode, shown in FIG. 10B, is a mode in which all discs housed in a pre-set one of the three interchange type disc reproducing apparatus 10a, 10b and 10c, herein 10b, are reproduced in the sequence of the first, disc, second disc and so forth up to the last disc. The third play mode, shown in FIG. 10C, is a mode in which a pre-set one of the interchange type disc reproducing apparatus 10, herein the apparatus 10a, is set by the disc selection key 16d, and all the programs of the pre-set optical disc D as set by the rotary jog 22 are reproduced. With the first play mode, the interchange type disc reproducing apparatus 10a, 10b and 10c are switched each time reproduction of one of the optical discs D comes to a close and another optical disc D is to be reproduced, so that reproduction is carried out continuously and no silent time interval is produced.

Figure 11A:
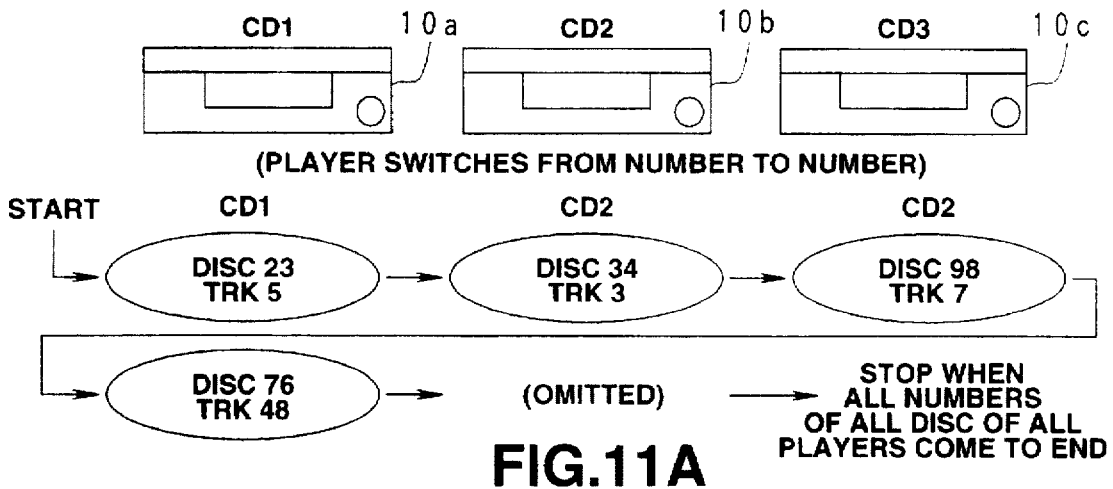
FIGS. 11A-11C illustrate an embodiment of random reproduction of plural interchange type disc reproducing apparatus.

There are three possible configurations of the shuffle mode. Of these, the first shuffle mode, shown in FIG. 11A, is such a play mode in which one of the plural discs housed within plural interchange type disc reproducing apparatus is selected at random and the programs recorded on the selected disc are selected at random for reproducing the programs of the entire apparatus in a random order.

Figure 11B:
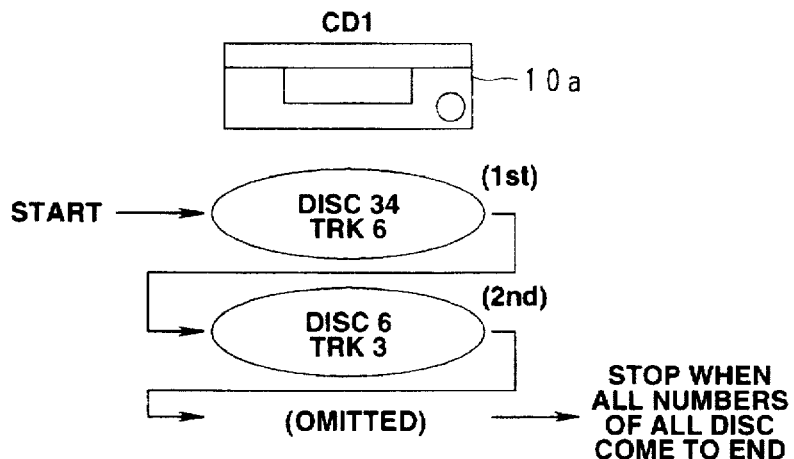

The second shuffle mode, shown in FIG. 11B, is such a play mode in which a disc is selected at random from the plural discs housed within a given one of the plural interchange type disc reproducing apparatus and programs are also selected at random from the programs stored in the selected discs for reproducing the programs in one given apparatus in a random order.

Figure 11C:
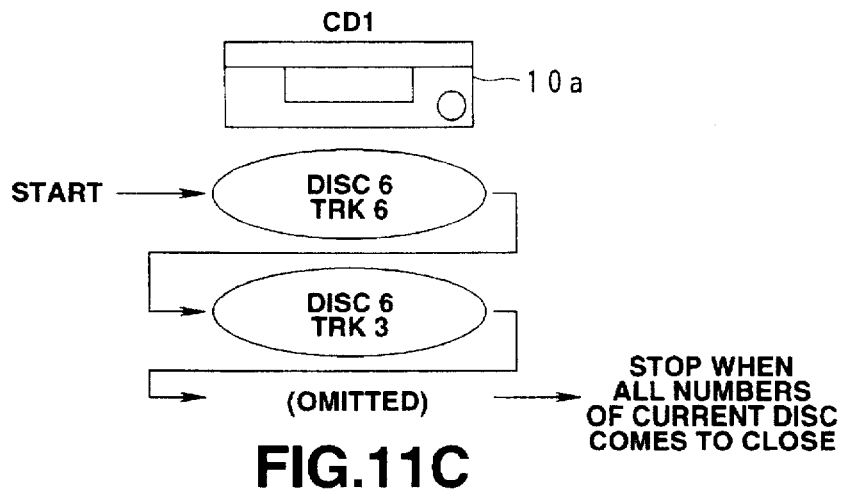

The third shuffle mode, shown in FIG. 11C, is a play mode in which a given disc is selected at random from the plural discs housed within a given one of the plural interchange type disc reproducing apparatus and the programs are selected at random from the programs stored in the selected disc for reproducing the programs in one given disc in a random order.

With the above-mentioned PROGRAM mode, since the play sequence of the interchange type disc reproducing apparatus, the play sequence of the discs housed within the interchange type disc reproducing apparatus, and the play sequence of programs recorded on the optical disc may be optionally set, continuous reproduction may be carried out in the programmed sequence without producing silent time period.

With the disc reproducing apparatus, the interchange type disc reproducing apparatus 10a, 10b and 10c are arbitrarily switched for playing in accordance with the CONTINUE mode, first and second play modes of the SHUFFLE mode or the PROGRAM mode. Thus, the optical discs D housed within the disc housing units 2 of the interchange type disc reproducing apparatus 10a, 10b and 10c may be continuously reproduced by the disc reproducing units 3 of the interchange type disc reproducing apparatus 10a, 10b and 10c without waste time thus improving the operability of the system. Thus, a disc reproducing apparatus is provided which may be extensively applied to a wide range of application such as for background music (BGM), dubbing or karaoke.

Figure 12:
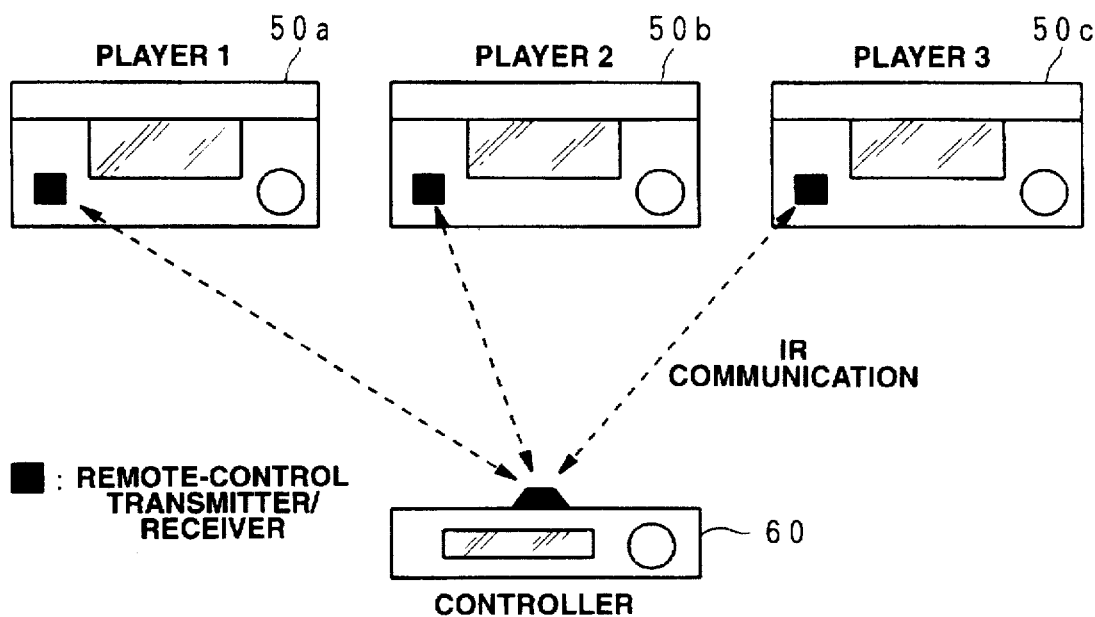
FIG. 12 illustrates a wireless connection configuration between a controller and plural interchange type disc reproducing apparatus.

Although the foregoing description has been made with reference to a system in which the interchange type disc reproducing apparatus 10 and the disc controller 20 are interconnected over a cable, the interchange type disc reproducing apparatus is not limited to this merely illustrative system. For example, the present invention may be applied to a system in which three interchange type disc reproducing apparatus 50a, 50b and 50c and a disc controller 60 communicate with the apparatus 50a, 50b and 50c, by bi-directional radio communication, such as with infrared rays, as shown in FIG. 12.

In addition, although the foregoing description has been made with reference to a system having plural interchange type disc reproducing apparatus each having a disc housing unit 2, and a disc reproducing unit 3 and the disc controller 20, the disc reproducing apparatus of the present invention is not limited to this illustrative system and may be applied to a system in which a disc housing unit, plural disc reproducing apparatus and the controller are provided in a common outer casing.

What is claimed is:

1. A disc system having a plurality of disc reproducing apparatus each configured for housing at least one disc and for reproducing the discs, said disc system controlling the playback sequence of the disc reproducing apparatus, said system comprising:

time detection means for detecting the residual play time of a disc currently reproduced by one of a plural disc reproducing apparatus;

comparator means for comparing the residual play time detected by the time detection means to a pre-set time; and control means for controlling, based upon the result of comparison by said comparator means, an optional optical disc of another one of the plural disc reproducing apparatus to a stand-by state for reproduction, said control means canceling the stand-by state of the optional disc of said another one of said disc reproducing apparatus on detection of termination of the reproduction of the disc by said one of the disc reproducing apparatus.

2. The disc system as claimed in claim 1 wherein the preset time used for comparison by said comparator means is longer than the time required for controlling the optional disc of said other disc reproducing apparatus to the stand-by state for reproduction.

3. The disc system as claimed in claim 1 wherein the residual play time for reproduction of the disc currently reproduced is judged based upon a control information recorded on the disc.

4. A controller for use with plural interchange type disc reproducing apparatus each housing a plurality of discs and each configured for selecting and reproducing an optional one of the discs, said controller controlling the playback sequence of the plural interchange type disc reproducing apparatus, said controller comprising:

reception means for receiving the playback state of a disc being reproduced by one of a plural interchange type disc reproducing apparatus; and transfer means for transferring a command for controlling an optional disc of another one of said plural interchange type disc reproducing apparatus to a playback stand-by state if the residual play time information as judged based upon the play state received by said reception means is less than a pre-set value, said transfer means also transferring a command for canceling the playback stand-by state of the optional disc of said another one of said plural interchange type disc reproducing apparatus if, based upon the play state received by said reception means, the reproduction of the disc by said one interchange type disc reproducing apparatus is judged to have come to a close.

5. The controller as claimed in claim 4 wherein said transfer means also transfers an identification code for selecting one of the plural interchange type disc reproducing apparatus.

6. The controller as claimed in claim 4 wherein the preset value used for comparison is longer than the time required for controlling the optional disc of said another one of said plural interchange type disc reproducing apparatus to the stand-by state for reproduction.

7. The controller as claimed in claim 4 wherein the residual play time information of the disc being reproduced is judged based upon a control information recorded on the disc.

8. The controller as claimed in claim 4 wherein said transfer means transfers an output switching command when it is judged that the reproduction of the disc being reproduced by the one interchange type disc reproducing apparatus has come to a close.

9. A method for controlling the playback sequence of a plural interchange type disc reproducing apparatus each housing a plurality of discs and each configured for selecting and reproducing an optional one of the discs, the method comprising the steps of:

receiving the playback state of a disc being reproduced by one of a plural interchange type disc reproducing apparatus;

transferring a command for controlling an optional disc of another one of said plural interchange type disc reproducing apparatus to a playback stand-by state if the residual play time information as judged based upon the play state received by said reception means is less than a pre-set value; and transferring a command for canceling the playback stand-by state of the optional disc of said another one of said plural interchange type disc reproducing apparatus if, based upon the play state received by said reception means, the reproduction of the disc by said one interchange type disc reproducing apparatus is judged to have come to a close.

10. The disc system as claimed in claim 2 wherein the residual play time for reproduction of the disc currently reproduced is judged based upon a control information recorded on the disc.

11. The controller as claimed in claim 5 wherein the preset value used for comparison longer than the time required for controlling the optional disc of said another one of said plural interchange type disc reproducing apparatus to the stand-by state for reproduction.

12. The controller as claimed in claim 11 wherein the residual play time information of the disc being reproduced is judged based upon a control information recorded on the disc.

13. The controller as claimed in claim 12 wherein said transfer means transfers an output switching command when it is judged that the reproduction of the disc being reproduced by the one interchange type disc reproducing apparatus has come to a close.

14. The method of claim 9 wherein said step of transferring also transfers an identification code for selecting one of the plural interchange type disc reproducing apparatus.

15. The method of claim 9 further including the step of setting wherein preset value used for comparison to be longer than the time required for controlling the optional disc of said another one of said plural interchange type disc reproducing apparatus to the stand-by state for reproduction.

16. The method of claim 9 further including the step of judging the residual play time information of the disc being reproduced based upon a control information recorded on the disc.

17. The method of claim 9 wherein said step of transferring includes transferring an output switching command when it is judged that the reproduction of the disc being reproduced by the one interchange type disc reproducing apparatus has come to a close.

18. A method of controlling the playback sequence of a disc system having a plurality of disc reproducing apparatus each configured for housing at least one disc and for reproducing the discs, said method comprising the steps of:

detecting a residual play time of a disc currently reproduced by one of a plural disc reproducing apparatus;

comparing the residual play time detected by the time detection means to a pre-set time; and controlling, based upon the result of comparison by said comparator means, an optional optical disc of another one of the plural disc reproducing apparatus to a stand-by state for reproduction, said step of controlling canceling the stand-by state of the optional disc of said another one of said plural disc reproducing apparatus on detection of termination of the reproduction of the disc by said one of the plural disc reproducing apparatus.

19. The method of claim 18 further including the step of setting the preset time used for comparison to be longer than the time required for controlling the optional disc of said another one of said plural disc reproducing apparatus to the stand-by state for reproduction.

20. The method of claim 18 further including the step of judging the residual play time for reproduction of the disc currently reproduced based upon a control information recorded on the disc.

21. A disc system having a plurality of disc reproducing apparatus each configured for housing at least one disc and for reproducing the discs, said disc system controlling the playback sequence of the disc reproducing apparatus, said system comprising:

time detection means for detecting the residual play time of a disc currently reproduced by one of a plural disc reproducing apparatus;

comparator means for comparing the residual play time detected by the time detection means to a pre-set time; and control means for controlling, based upon the result of comparison by said comparator means, an optional optical disc of another one of the plural disc reproducing apparatus to a stand-by state for reproduction, said control means canceling the stand-by state of the optional disc of said another one of said plural disc reproducing apparatus on detection of termination of the reproduction of the disc by said one of the disc reproducing apparatus;

wherein there are provided three selectable modes, namely a continuous reproducing mode, a random mode and a program mode, said continuous reproducing mode being such a mode in which the discs housed within the plural disc reproducing apparatus are reproduced continuously from one disc reproducing apparatus to another, said random mode being such a mode in which one of the disc reproducing apparatus is selected based upon a random number and the programs of the discs housed within the selected apparatus are selected based upon the random number, said program mode being such a mode in which the programs recorded on a disc housed within the disc reproducing apparatus may be optionally selected by the user and the programs selected by the user are reproduced.

22. The disc system of claim 21 wherein the preset time used for comparison by said comparator means is longer than the time required for controlling the optional disc of said another one of said plural disc reproducing apparatus to the stand-by state for reproduction.

23. The disc system of claim 21 wherein the residual play time for reproduction of the disc currently reproduced is judged based upon a control information recorded on the disc.

* * * * *